United States Patent
Weiser

[19]

[11] Patent Number: 5,829,187
[45] Date of Patent: Nov. 3, 1998

[54] DELIVERY SYSTEM

[75] Inventor: Stanley A. Weiser, St. Louis, Mo.

[73] Assignee: Seaforth Industries, LLC, St. Louis, Mo.

[21] Appl. No.: 810,536

[22] Filed: Mar. 3, 1997

Related U.S. Application Data

[60] Provisional application No. 60/012,798 Mar. 4, 1996.
[51] Int. Cl.$^6$ ..................................................... A01M 1/16
[52] U.S. Cl. ................................................. 43/116; 43/114
[58] Field of Search ............................. 43/111, 114, 116; 242/596.6, 596.7, 614, 134, 538.2, 395

[56] References Cited

U.S. PATENT DOCUMENTS

| | | | |
|---|---|---|---|
| 124,178 | 2/1872 | Walter | 242/395 |
| 485,815 | 11/1892 | Koecher | 43/114 |
| 878,268 | 2/1908 | Bayer | 43/116 |
| 1,441,306 | 1/1923 | Snuffer et al. | 43/111 |
| 1,462,873 | 7/1923 | Shockey et al. | 43/111 |
| 1,477,081 | 12/1923 | Salinas | 43/111 |
| 2,249,718 | 7/1941 | Travnicek | 43/116 |
| 3,954,226 | 5/1976 | Pickering | 242/395 |
| 4,327,874 | 5/1982 | Bruno | 242/596.7 |
| 4,702,429 | 10/1987 | Black | 242/614 |
| 4,865,261 | 9/1989 | Bare et al. | 242/614 |
| 5,189,829 | 3/1993 | Johansson | 43/114 |
| 5,255,866 | 10/1993 | Campolo | 242/614 |
| 5,369,908 | 12/1994 | Morales | 43/111 |
| 5,628,142 | 5/1997 | Kitterman et al. | 43/114 |
| 5,634,292 | 6/1997 | Kitterman | 43/115 |

Primary Examiner—Michael J. Carone
Assistant Examiner—Darren Ark
Attorney, Agent, or Firm—Blackwell Sanders Peper Martin

[57] ABSTRACT

A fly (insect) control program is implemented by the disclosed fly tape delivery system having source spool assembly and a take-up spool assembly, providing for fly tape to be extended between the two assemblies located at spaced apart locations with premises to be protected. Each spool assembly includes a hub and a reel adapted for being carried by the hub in selectively latched and unlatched positions, the reel of the source spool assembly providing a rolled length of fresh fly tape, and the reel of the take-up spool assembly providing a location for rolling up the fly tape after becoming coated with flies. When a reach of the fly tape is extended from the reel of the source spool assembly to the reel of the take-up spool assembly, tautness of the reach of tape is maintained by a latched relation of each spool assemblies which prevents the reel of each spool assembly is prevented from turning relative to the hub of the respective spool assembly. But when unlatched, the reel of each spool assembly is permitted to rotate relative to the hub of the respective spool assembly, for winding fresh fly tape from the source spool assembly to the take-up spool assembly, while winding coated fly tape onto the reel of the take-up spool assembly.

15 Claims, 4 Drawing Sheets

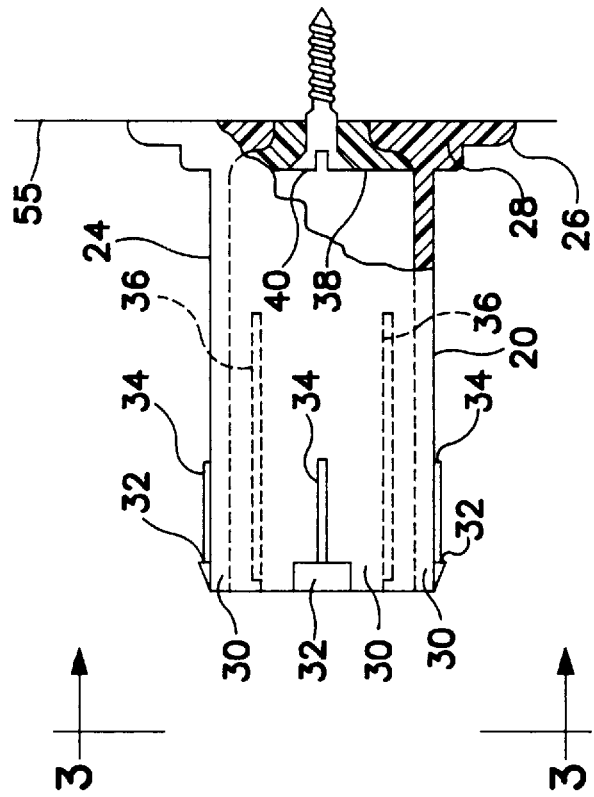
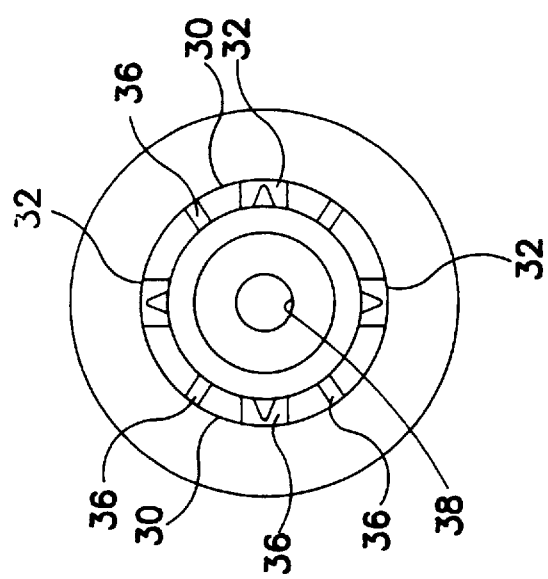
FIG. 2
FIG. 3

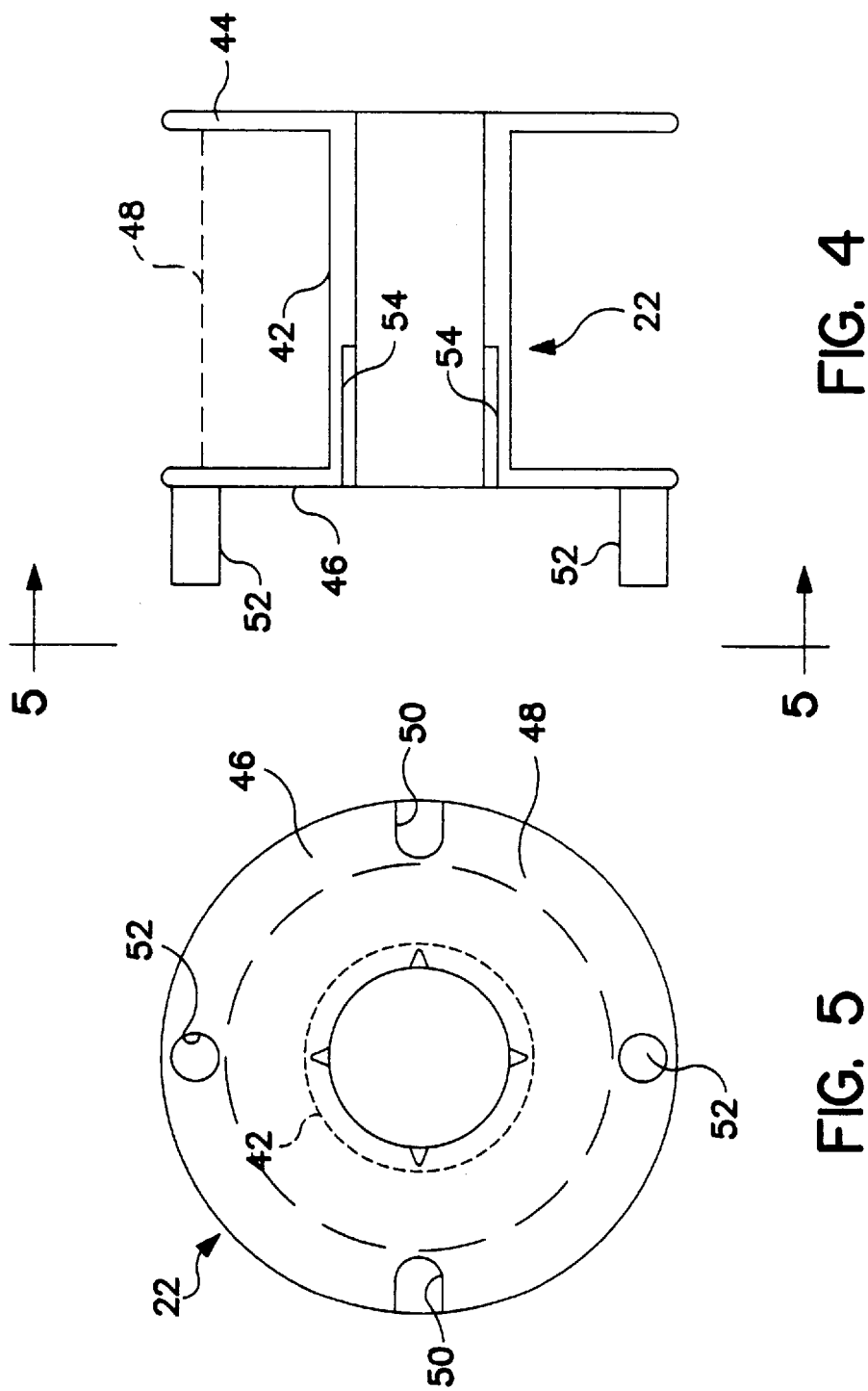

DELIVERY SYSTEM

CROSS REFERENCE TO RELATED APPLICATION

This application is based on Provisional Patent Application Ser. No. 60/012,798, of Stanley A. Weiser for DELIVERY SYSTEM, filed 4 Mar. 1996.

BACKGROUND OF THE INVENTION

1. Field of the Invention

The invention relates to pest control and, more particularly, to a delivery system for delivering a length insect-trapping ligament material, viz., fly tape, for use in trapping and killing insects, primarily flies.

2. Related Art

It has heretofore been proposed, as in U.S. Pat. No. 5,189,829, to coat a cord with a sticky glue, orienting the cord and maintaining it lengthwise within an enclosed spaces such as stables for trapping flies or other insects. The concept of horizontally disposing an adhesive-coated ligament material for insect entrapment dates to 1928 in French patent No. FR-A-660 240; and 1928 French patent FR-A-660 240 relates to a fly catching tape which, packaged in folded form into a container, can be drawn out into an elongated web of material in either a generally horizontal position or a vertical configuration, as in suspended configuration, e.g., in the manner of venerable, well-known fly paper. There have also been commercially available rolls of adhesive-coated tape, so-called fly tape, which can be mounted by the user in a position from which the fly tape can be unrolled, as from a drum of the coiled tape, and pulled over rollers into an insect-trapping use position, whether horizontally or otherwise.

Such proposed and commercially available systems have had certain disadvantages which it is now desired to overcome by the presently proposed delivery system.

Among such disadvantages are that the adhesive-coated tape is extremely tenacious, its adhesive coating tending to stick to any surface or object with which it may come into contact, so that its handling must be very carefully carried out. Moreover, the proper use of adhesive-coated tapes mandates that they be replaced after hours or days of use, that is, after becoming coated with insects. Such requires extending a fresh length of the adhesive-coated tape. Pulley arrangements have been proposed to facilitate "pulling" a length of the tape from such a drum into a use disposition.

But such existing arrangements suffer from certain inconveniences as well as the possibility that a length of the tape as it is being pulled may sag unacceptably, possibly contacting a stable floor or animals in the stable. In general, such existing and previously proposed arrangements can be awkward in use and have in general not been convenient or suitable for smaller premises.

SUMMARY OF THE INVENTION

It is in view of the above problems that the present invention was developed. The present invention contemplates carrying out a fly control program by using an adhesive-coated tape (hereinafter referred to as so-called fly tape) delivery system providing a number of distinct advantages and with manifest suitability for a gamut of possible uses not previously proposed or carried out with previous success, such as in smaller commercial premises, such as restaurants, food processing establishments, being in general capable of unlimited area of usage under any covered area, such as dairy barns, horse stables, swine, poultry and all other animal premises, such as veterinary areas, zoos and kennels. It may also be used in military installations and quarters. Hospitals, field hospitals and clinics and temporary treatment facilities may effectively use the system. Usage may also be made in poultry-processing or raising establishments, and other areas where flying pest control is desired. For example, it may be used in bakeries, canneries, industrial factories, refuse areas and in markets. Other examples include desirable usages of fly tapes in households, garages, backyards, patios, at lawn parties, on boat docks, and in camping locations, just as illustrations of myriad possible usages.

In such usages the proposed new adhesive-coated tape (fly tape) delivery system of the present invention allows fly tape to be delivered from a source, dispositioned reliably and easily in typical horizontal configuration without sagging out of control or contact other objects, and to be captured at a take-up, as well as to be renewed by pulling a fresh length of the fly tape from the source while using the take-up to store the used fly tape, all in a highly convenient, tidy arrangement.

In addition, the new fly tape delivery system involves using the source and take-up as the securing end points of a horizontally disposed reach of the fly tape, without resort to bails, brackets, auxiliary structure, or other awkward locking or clumsy securing elements. That is, the source and take-up are themselves the anchors at each end of the reach, and yet readily facilitate winding a fresh length of the fly tape without dismounting or otherwise rearranging or replacing the source and take-up.

BRIEF DESCRIPTION OF THE DRAWINGS

FIG. 2 is a horizontal elevation of a hub of a spool assembly used for both the source and the take-up of FIG. 1.

FIG. 3 is an end elevation view of the hub, as taken along line 3—3 of FIG. 2.

FIG. 4 is a horizontal elevation of a spool of the spool assembly.

FIG. 5 is an end elevation view of the spool as taken along line 5—5 of FIG. 4.

Corresponding reference characters indicate corresponding parts throughout the several views of the drawings.

DETAILED DESCRIPTION OF THE PREFERRED EMBODIMENTS

DETAILED DESCRIPTION OF PRACTICAL EMBODIMENTS

Figure 1:
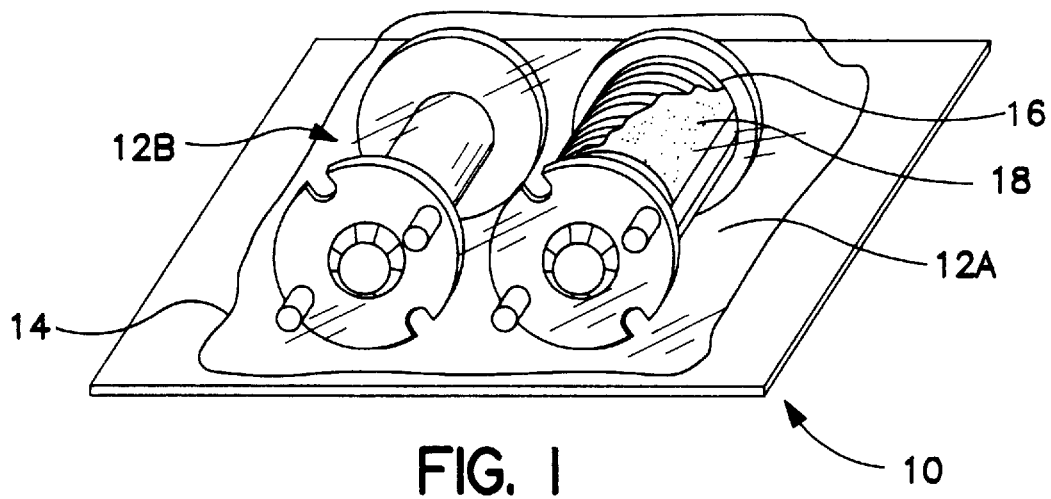
FIG. 1 is a perspective view of a adhesive-coated tape (fly tape) delivery system in accordance with and embodying the present invention, providing both a source of fresh fly tape and a take-up for used fly tape.

Referring to the accompanying drawings in which like reference numbers indicate like elements, 10 generally indicates a delivery system of the invention, as provided by fly tape spool assemblies generally designated 12A,12B for delivery of adhesive-coated tape, herein called fly tape, and presentation of the fly tape in a configuration for catching flies and other insects in premises of the character hereinabove described.

A presentation package 14, i.e., a so-called blister pack, preferably is used to package the pair of assemblies 12A, 12B, so that both are available for user disposition and mounting, and because assemblies 12A,12B are used together in a cooperative manner for winding the fly tape from one assembly to the another and for presenting the tape horizontal use configuration according to the below-described method of use.

Spool assembly 12A for these purposes is pre-wound with a rolled quantity 16 of fly tape, which is preferably white polymer coated with a very sticky clear resin devoid of insecticides or attractants, as well as being non-allergenic and non-irritating to the human. The fly tape is environmentally and ecologically acceptable and without peer, and is capable of instantly adhering flies and other types insects to the tape when they land on the tape. Such flies or other insects are unavoidably stuck to the tape. The fly tape is most preferably of commercially available type heretofore available from Seaforth Industries, LLC, of St. Louis, Mo. USA. The fly tape roll 16 of spool assembly 12A may be for example about 81 linear feet, as thus suitable for use in premises where an overall reach of fly tape of less than about 80 feet is desired. On spool assembly 12A, roll 16 is protectively coated with a peel-off wrapping 18 for protecting the fly tape in package 12 until mounting of the spool assemblies according to the below-described method of mounting and use.

Each spool assembly 12A,12B is identical except that spool assembly 12A is pre-loaded with roll 16; and spool assembly 12B is initially empty. Thus, referring to FIGS. 2–4, description of assembly 12B suffices to explain each.

Each spool assembly comprises a hub 20 and a spool, herein referred to as a reel 22. Hub 20 is in effect a bracket for mounting of reel 22 which is receivable upon hub 20 in latching relation, as shown in FIG. 6, showing a latched interrelationship of the hub and spool; and permitting also an unlatched interrelationship of the hub and spool, as shown in FIG. 7.

Referring to FIGS. 2 and 3, hub 20, as injection-molded, cast or otherwise formed of thermoplastic or other suitable polymer to provide an integral one-piece configuration, includes a tubular hollow shaft 24 having a proximal inner end defining a peripherally flanged base 26 including a stepped shoulder 28 to serve as a bearing surface for supported rotation of reel 22. Shaft 24 has an opposite distal outer end which is notched to provide a plurality of fingers 30, the outer ends of at least some of which carry bevelled latch extensions 32, from which extend a short distance proximally ribs 34 of narrow rectangular-section, and which raised from the otherwise cylindrical outer surface of hub 20. Notches, as at 36 are defined between the fingers, extending preferably at least about half the distance from the distal end inwardly toward the flanged base 26, so that for purposes presently appearing, fingers 30, being resilient, can be flexibly pressed radially inwardly at their distal ends for latching and unlatching purposes, as explained below.

Base 26 is closed but provided with a central screw opening 38 for receiving a screw anchor, wood screw or other suitable fastening element 40. Preferably blister pack 14 supplies a pair of screw anchors for facilitating installation. More than one screw opening may be provided if desired, but one is found to be sufficient for secure fastening.

Figure 6:
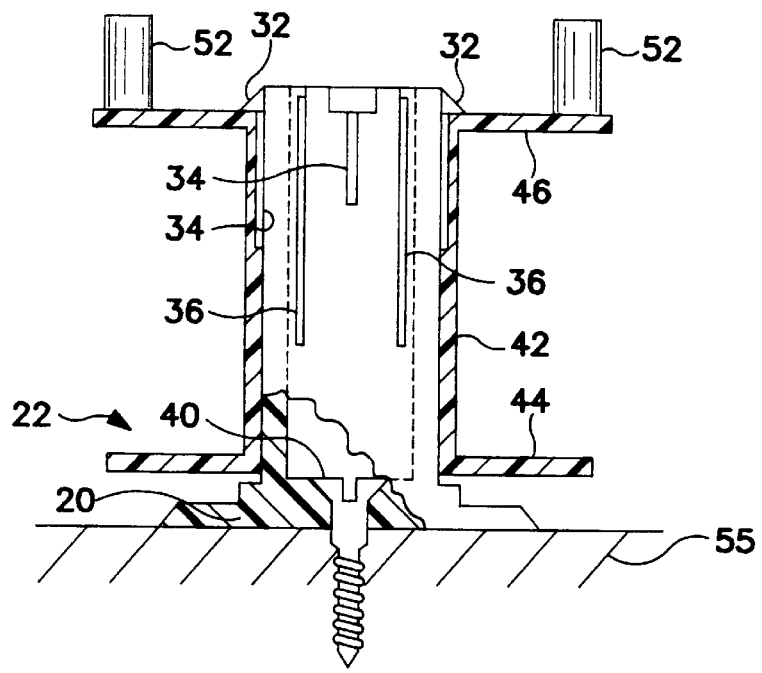
FIG. 6 is a first cross-section of the spool assembly showing a latched interrelationship of the hub and spool.
Figure 7:
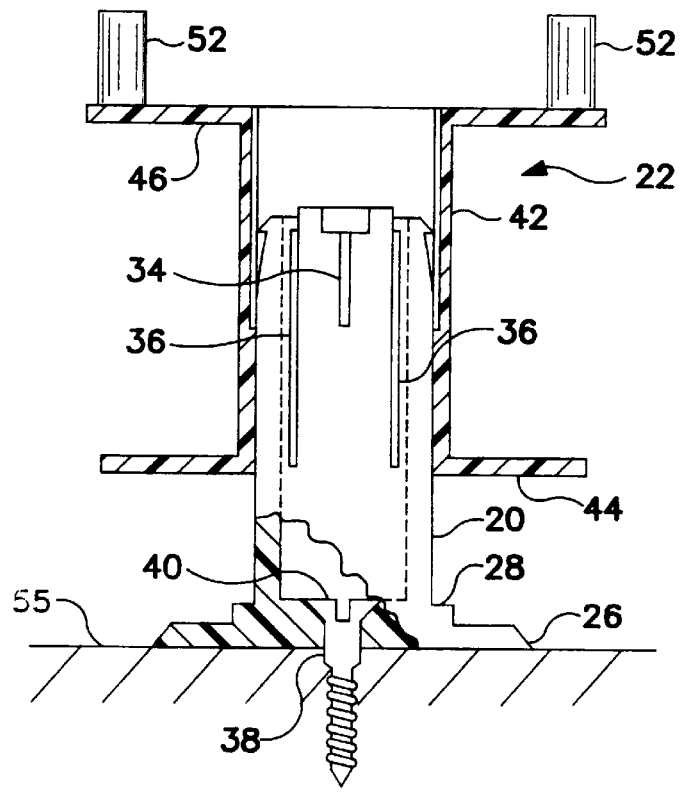
FIG. 7 is a second cross-section of the spool assembly showing an unlatched interrelationship of the hub and spool.

FIGS. 4 and 5 show the reel 22, which comprises a cylindrical hub 42 of hollow cylindrical configuration, having an inner diameter just sufficient for sliding and easy rotational movement upon hub 20, generally as depicted in FIGS. 6 and 7. Hub 42 carries at its proximal, inner end a base flange 44 and at its outer, opposite, proximal end an outer flange 46, each of diameter sufficient for winding of at least about 81 linear feet of fly tape about hub 42 to a winding level 48 comfortably within the radius of inner extent of each of a pair of arcuate notches 50 diametrically disposed within outer flange 46. Carried on outer flange 46 are a diametrically disposed pair of cranking projections or what may be here called knobs 52. Notches 50 are so oriented and sized that they will receive the knobs 52 of an adjacent reel 22 for nested relationship when reels are stacked in a box as for shipment or storage.

Like hub 20, reel 22 is injection-molded, cast or otherwise formed of the same or similar or complementary materials as hub 20.

During its formation, reel 22 is formed with narrow rectangular-section grooves 54 of dimension sufficient to receive ribs 34 of hub 20, and diametrically opposed in the same manner as ribs 34, so as to lockingly engage with ribs 34 when reel 22 is fully seated on the hub, as in FIG. 6.

Referring to FIGS. 6 and 7, hub 20 is shown secured to a surface 55 by screw 40 in a position of desired use. Hub 20 in use is intended to occupy two possible positions relative to reel 22, namely either fully seated (FIG. 6) and locking engaged such as to prevent relative rotation, or as unlatched (FIG. 7) and raised off flange shoulder 28 by a distance sufficient to unlatch ribs 34 from grooves 54 for permitting rotation relative to hub 20. When in latched position, reel 22 is held secured axially by bevelled latch extensions 32, which as shown in FIG. 6, project beyond the outer surface of flange 46 to retain reel 22 in latched position on hub 20. Extensions 32 may easily be engaged by the fingers of the user to unlatch reel 22 from hub 20, so that reel 22 may be moved to the position in FIG. 7.

Figure 8A:
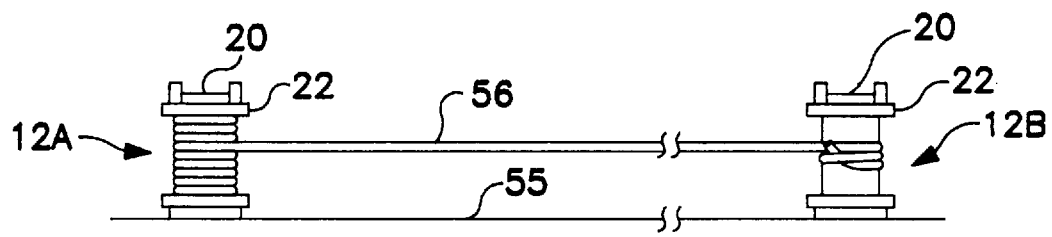
FIGS. 8A, 8B and 8C are illustrations of the delivery system in use, depicting respectively a fresh tape initial use configuration, a used tape condition, and a refreshening step in which fresh fly tape is pulled from a source spool assembly while used fly tape is being wound upon a take-up spool assembly.
Figure 8B:
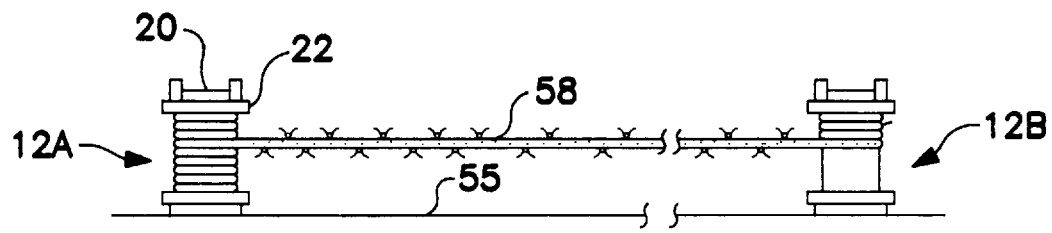
Figure 8C:
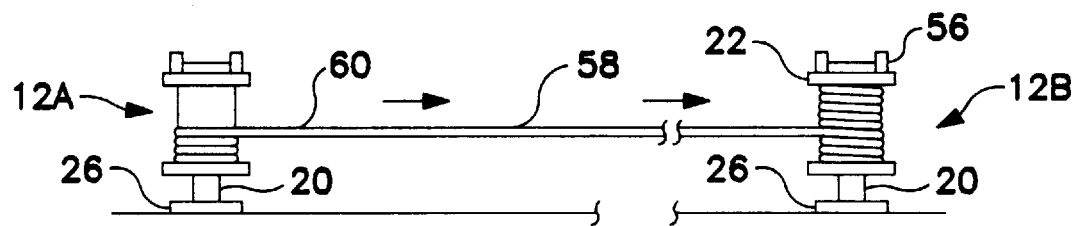

Use of the system is carried out as shown in FIGS. 8A–8C. Spool assembly 12A is installed on a wall or ceiling preferably 8 ft or more above floor or ground level, namely overhead, at one end of a location in which there is to be a horizontal length of fly tape. It is best to avoid areas near fans because flies do.

Using a screwdriver or appropriate tool, fastener 40 is tightened to secure hub 20 to the attachment surface. Thus, in the case of wood, the fastener may be a wood screw, and in the case of drywall mounting, it may be a screw anchor. Reel 22, preloaded with fly tape, may remain on hub 20 during securement, or may be inserted onto the hub after securement. Cover 18 may be removed.

Take-up spool assembly 12B is now mounted, by similarly affixing its hub 20 a desired distance, such as for example about 20 ft, from the source spool assembly 12A.

Then, manually pressing projections 32 toward each other, the source reel 22 can be pulled to its unlatched position, if not already unlatched. A length of fly tape is pulled from the source reel 22 and over to the take-up reel 22, about which is turned a couple of times. The source reel 22 is pushed into latched position to maintain tautness of the resultant horizontal virgin length 56 of adhesive-coated fly tape.

Remaining in this position, as shown in FIG. 8A, length 56 is an inviting place for flies, in particularly, which tend to land on horizontal edges, and which aggregate. They land and stick to tape length 56 in large numbers when they are present.

When the adhesive-coated fly tape is coated with flies, as depicted in FIG. 8B at 58, reels 22 of each of spool assembly 12A and take-up spool assembly 12B are unlatched, and using crank knob 56, the take-up reel 22 is wound to reel in the coated tape 58, including the attracted flies and other insects. Fresh fly tape rolls out at the same time, as evident from coated tape portion 58 and fresh tape portion 60 until an overall length of fresh fly tape is in place. The source and take-up reels 22 are then relatched, maintaining the tautness of the fresh fly tape, which is ready to grab more flies.

The process is repeated in hours, days or weeks as necessary until the fly tape is exhausted.

A new source reel 22, as a refill, is then used, as in place of the filled take-up reel 22 (FIG. 8C), becoming now a source for the opposite spool assembly, which may then be the take-up spool assembly, or the reels positions may be changed.

The filled reel 22 may be safely discarded, including flies.

Therefore, there is provided an extremely safe, secure, simple, easily installed, easily updated, no-mess fly tape delivery system which thus achieves a most effective, no-fuss fly control program. It achieves effective 24-hour fly reduction for many days at a time.

In view of the foregoing description of the present inventive constructions and methods, it will be seen that the several objects of the invention are achieved and other advantages are attained.

The embodiments chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

I claim:

1. A fly tape delivery system comprising a source spool assembly and a take-up spool assembly, each of the spool assemblies including a hub and a reel adapted for being carried by the hub in selectively latched and unlatched positions, the reel of the source spool assembly providing a rolled length of fresh fly tape, and the reel of the take-up spool assembly providing a location for rolling up fly tape which has been coated with flies, means for mounting the hubs in spaced apart locations for extending a reach of the fly tape from the reel of the source spool assembly to the reel of the take-up spool assembly, the reels and hubs of the respective spool assemblies being configured such that when latched, the reel of each spool assembly is prevented from turning relative to the hub of the respective spool assembly, and when unlatched the reel of each spool assembly is permitted to rotate relative to the hub of the respective spool assembly, for permitting winding fresh fly tape from the source spool assembly to the take-up spool assembly, while winding coated fly tape onto the reel of the take-up spool assembly, the reel of each spool assembly being longitudinally shiftable along an axis of rotation of the reel between its latched and unlatched positions, the hub of each spool assembly including integral locking means configured for lockingly engaging the reel to prevent rotation of the reel about the hub when the reel is in its latched position, the locking means being responsive to selective longitudinal movement of the reel to its unlatched position for permitting selective rotation of the reel about the hub, the locking means being also configured for retaining the reel in its latched position.

2. The fly tape delivery system as set forth in claim 1 wherein the locking means comprises a notched region of each hub of each of the spool assemblies forming at least one finger carrying at a distal outer end thereof a radially raised longitudinal locking rib, the reel of each of the spool assemblies defining at least one longitudinal locking notch on an interior aspect of the reel for receiving the raised longitudinal locking rib of the hub when the reel is in its latched position to prevent rotation of the reel about the hub, the finger flexing upon longitudinal movement of the reel to its unlatched position to withdraw the locking rib from the locking notch for permitting rotation of the reel about the hub.

3. The fly tape delivery system as set forth in claim 2 wherein the reels of each of the spool assemblies are each formed of resilient synthetic resin material, the finger of each of the hubs being resiliently flexible and carrying at the distal outer end beyond the locking rib, an engagement portion engaging each of the reels for causing resilient flexing of the finger for withdrawal of the locking rib from the locking notch upon longitudinal movement of each of the reels.

4. The fly tape delivery system as set forth in claim 3 wherein said engagement portions of each of the fingers is configured for retaining each of the reels in its latched position.

5. The fly tape delivery system as set forth in claim 4 wherein said engagement portions are radial latching extensions of the fingers which cause the fingers to flex radially inwardly in relation to each of the reels when each of the reels is shifted to its unlatched position, the radial extensions extending longitudinally beyond each of the reels to secure each of the reels when it is in its latched position.

6. The fly tape delivery system as set forth in claim 2 wherein the hubs are notched to provide a plurality of such fingers and the reels are notched on an internal surface to provide a corresponding plurality of locking notches for receiving respective longitudinal locking ribs of the fingers.

7. The fly tape delivery system as set forth in claim 1 wherein the hubs serve as brackets for mounting of the reels of the respective spool assemblies.

8. A method of carrying out a continuous fly control program, comprising installing fly tape by using a fly tape delivery system according to claim 1, by first mounting the hubs of the source and take-up spool assemblies at spaced apart positions overhead in a premises in which the fly control program is to be carried out, maintaining the reach of fly tape in taut condition by latched orientation of the reels relative to their respective hubs, until the reach is coated with flies, and then unlatching the reels with respect to their respective hubs and then cranking the reel of the take-up spool assembly about its respective hub for winding fresh fly tape from the source spool assembly to the take-up spool assembly until a fresh reach of fly tape is in place.

9. A fly tape delivery system comprising a source spool assembly and a take-up spool assembly, each of the spool assemblies including a hub and a reel adapted for being carried by the hub in selectively latched and unlatched positions, the reel of the source spool assembly providing a rolled length of fresh fly tape, and the reel of the take-up spool assembly providing a location for rolling up fly tape which has been coated with flies, means for mounting the hubs in spaced apart locations for extending a reach of the fly tape from the reel of the source spool assembly to the reel of the take-up spool assembly, the reels and hubs of the respective spool assemblies being configured such that when latched, the reel of each spool assembly is prevented from turning relative to the hub of the respective spool assembly, and when unlatched the reel of each spool assembly is permitted to rotate relative to the hub of the respective spool assembly, for permitting winding fresh fly tape from the source spool assembly to the take-up spool assembly, while winding coated fly tape onto the reel of the take-up spool assembly, the reel of each spool assembly being longitudinally shiftable along an axis of rotation of the reel between its latched and unlatched positions, the hub of each spool assembly being notched to form at least one finger including a distal outer end carrying a radially raised longitudinal locking rib, the reel of the spool assembly defines at least one longitudinal locking notch on an interior aspect of the spool for receiving the raised longitudinal locking rib of the hub when the reel is in its latched position to prevent rotation of the reel about the hub, the finger flexing upon longitudinal movement of the reel to its unlatched position to withdraw the locking rib from the locking notch for permitting rotation of the reel about the hub.

10. A method of carrying out a continuous fly control program, comprising installing fly tape by using a fly tape delivery system according to claim 9, by first mounting the hubs of the source and take-up spool assemblies at spaced apart positions overhead in a premises in which the fly control program is to be carried out, maintaining the reach of fly tape in taut condition by latched orientation of the reels relative to their respective hubs, until the reach is coated with flies, and then unlatching the reels with respect to their respective hubs and then cranking the reel of the take-up spool assembly about its respective hub for winding fresh fly tape from the source spool assembly to the take-up spool assembly until a fresh reach of fly tape is in place.

11. The fly tape delivery system as set forth in claim 9 wherein the hubs serve as brackets for mounting of the reels of the respective spool assemblies.

12. The fly tape delivery system as set forth in claim 9 wherein the reels are made of a resilient material such that, when each of the reels is moved from its latched to its unlatched position, it resiliently bears against the distal outer end of the finger for causing the finger to resiliently flex radially inwardly in relation to the reel.

13. The fly tape delivery system as set forth in claim 9 wherein the outer distal end of the finger carries a radial latching extension beyond the locking rib which causes the finger to flex radially inwardly in relation to the reel, when the reel is shifted to its unlatched position, the radial extension extending longitudinally beyond the reel to secure the reel when it is in its latched position.

14. The fly tape delivery system as set forth in claim 13 wherein the hubs are made of a resilient material such that, when latched to the reels, the distal outer ends of the fingers can flex radially inwardly in relation to the reels, unlatching the reels from the hubs, and allowing the reels to rotate freely about the hubs.

15. The fly tape delivery system as set forth in claim 9 wherein the hubs are notched to provide a plurality of such fingers and the reels are notched on an internal surface to provide a corresponding plurality of locking notches for receiving respective longitudinal locking ribs of the fingers.

\* \* \* \* \*

UNITED STATES PATENT AND TRADEMARK OFFICE
CERTIFICATE OF CORRECTION

PATENT NO.  : 5,829,187
DATED       : November 3, 1998
INVENTOR(S) : Weiser, Stanley A.

It is certified that error appears in the above-indentified patent and that said Letters Patent is hereby corrected as shown below:

IN THE CLAIMS:

Claim 5, line 36, after "of" insert --each of-- and after "cause" insert --each of--.

Signed and Sealed this

Sixteenth Day of March, 1999

Attest:

Q. TODD DICKINSON

*Attesting Officer*   *Acting Commissioner of Patents and Trademarks*